US012045018B2

(12) United States Patent
Summerville et al.

(10) Patent No.: US 12,045,018 B2
(45) Date of Patent: Jul. 23, 2024

(54) DEVICE TIME-KEEPING STANDARD ADJUSTMENT

(71) Applicant: Lenovo (Singapore) Pte. Ltd., Singapore (SG)

(72) Inventors: Mark K Summerville, Apex, NC (US); Richard Todd Wall, Garner, NC (US); Justin Michael Ringuette, Morrisville, NC (US); Sandy Collins, Durham, NC (US); Aravind Senthil Murugan, Cary, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 525 days.

(21) Appl. No.: 17/344,260

(22) Filed: Jun. 10, 2021

(65) Prior Publication Data

US 2022/0397868 A1 Dec. 15, 2022

(51) Int. Cl.

*G04G 21/02* (2010.01)
*G04G 5/00* (2013.01)
*G04G 9/00* (2006.01)

(52) U.S. Cl.

CPC ............... *G04G 21/02* (2013.01); *G04G 5/00* (2013.01); *G04G 9/007* (2013.01)

(58) Field of Classification Search

CPC ........... G04G 21/02; G04G 5/00; G04G 9/007
See application file for complete search history.

(56) References Cited

U.S. PATENT DOCUMENTS 6,611,789 B1 * 8/2003 Darley ................ G04G 21/025 702/160
7,426,156 B1 * 9/2008 Bahder .................... G04G 7/02 701/472
2019/0377303 A1 * 12/2019 Aoki .................... G04G 9/0076
2021/0132551 A1 * 5/2021 Sasahara ................. G04G 9/00

* cited by examiner

*Primary Examiner* — Edwin A. Leon
*Assistant Examiner* — Sean R Brannon
(74) *Attorney, Agent, or Firm* — Ference & Associates LLC

(57) ABSTRACT

One embodiment provides a method, including: monitoring, using an accelerometer integrated with an information handling device, gravitational acceleration experienced by the information handling device; identifying, based on the monitoring, a change in the gravitational acceleration from a first gravitational acceleration metric to a second gravitational acceleration metric; and adjusting, responsive to the identifying, a time-keeping standard referenced by the information handling device based on the second gravitational acceleration metric. Other aspects are described and claimed.

18 Claims, 3 Drawing Sheets

DEVICE TIME-KEEPING STANDARD ADJUSTMENT

BACKGROUND

Information handling devices ("devices"), for example, phones (e.g., smart phones, mobile phones, etc.), tablets, wearable devices (e.g., smart watches, fitness trackers, etc.), laptop computers, hybrid devices, and the like, are capable of tracking various contextual metrics associated with a user. For example, devices are capable of identifying a user's physical location (e.g., using one or more location determination techniques, etc.) and identifying a time zone, or time-keeping standard, associated with that location. These metrics may be continually tracked by the device and may be utilized by the device in various ways (e.g., to update calendar data, to manage alert notifications and message distributions, to identify relevant weather data, etc.).

BRIEF SUMMARY

In summary, one aspect provides a method, including: monitoring, using an accelerometer integrated with an information handling device, gravitational acceleration experienced by the information handling device; identifying, based on the monitoring, a change in the gravitational acceleration from a first gravitational acceleration metric to a second gravitational acceleration metric; and adjusting, responsive to the identifying, a time-keeping standard referenced by the information handling device based on the second gravitational acceleration metric.

Another aspect provides an information handling device, including: an accelerometer; a processor; a memory device that stores instructions executable by the processor to: monitor, using the accelerometer, gravitational acceleration experienced by the information handling device; identify, based on the monitoring, a change in the gravitational acceleration from a first gravitational acceleration metric to a second gravitational acceleration metric; adjust, responsive to the identifying, a time-keeping standard referenced by the information handling device based on the second gravitational acceleration metric.

A further aspect provides a product, including: a storage device that stores code, the code being executable by a processor and comprising: code that monitors gravitational acceleration experienced by an information handling device; code that identifies, based on the code that monitors, a change in the gravitational acceleration from a first gravitational acceleration metric to a second gravitational acceleration metric; and code that adjusts, responsive to the code that identifies, a time-keeping standard referenced by the information handling device based on the second gravitational acceleration metric.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
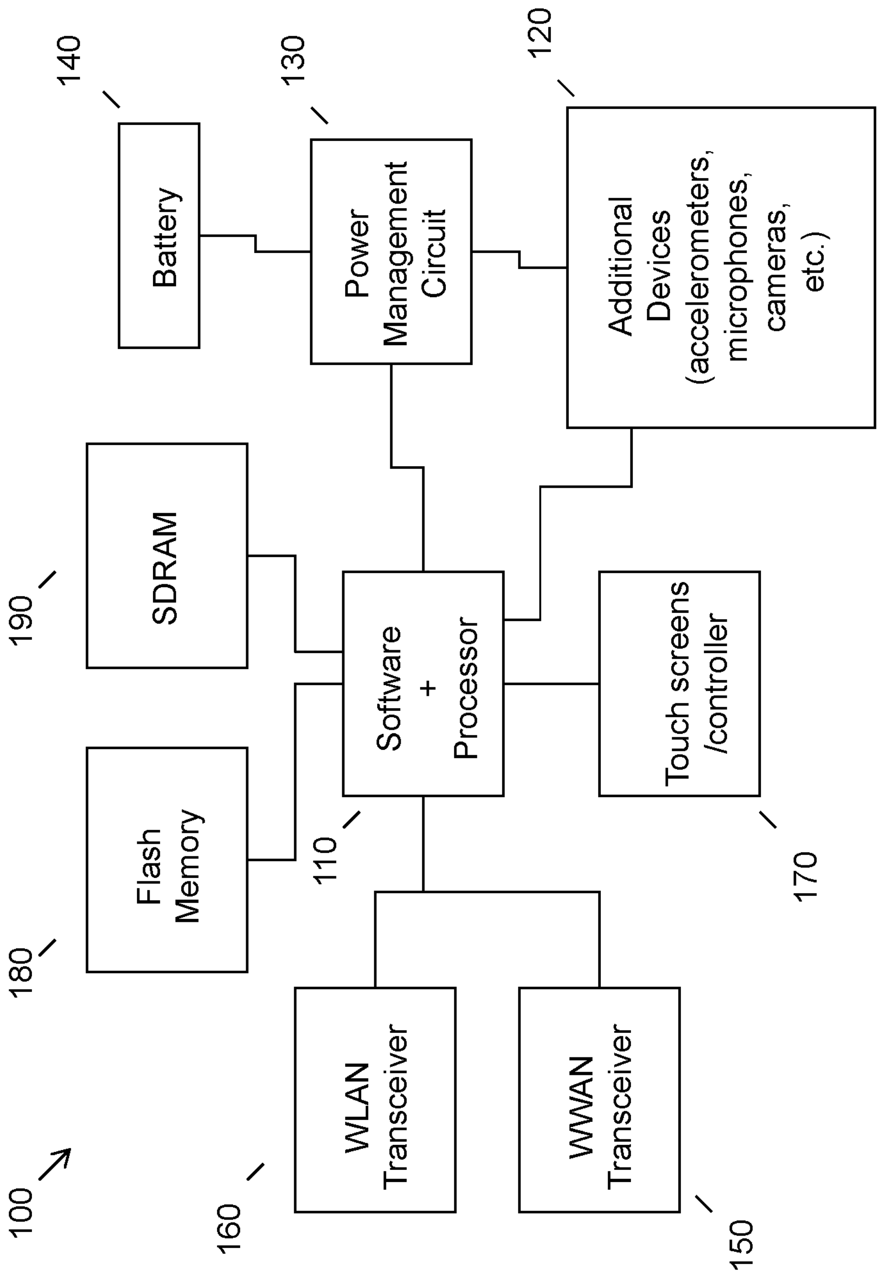
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventional methods exist for identifying a time zone a user is in. For example, Global Positioning System (GPS) data may be obtained from GPS satellites to allow a user's device to determine its physical location on Earth. While an effective location determination technique on Earth, such a method may not be applicable as humans begin to expand their reach into outer space. More particularly, as space travel becomes more economically efficient (i.e., as the cost/pound to send objects and people into space decreases), the prevalence of space tourism and space business will correspondingly increase.

One appreciable difficulty that space-faring individuals may experience is the identification and tracking of relevant time. More particularly, conventional GPS satellites are aimed downward to enable surface and airborne users to identify their physical location on Earth. From this identified location, a device can dynamically update a time setting to a corresponding time zone. However, once an individual passes an orbital plane associated with these satellites, no conventional methods exist that can dynamically identify which time zone a user is in and/or what time may be relevant to the device/user.

Accordingly, an embodiment provides a method for dynamically identifying a time-keeping standard associated with a device based at least in part on gravitational acceleration data. In an embodiment, an accelerometer associated with a device may monitor gravitational acceleration experienced by the device. Responsive to identifying that there is a change to the gravitational acceleration (e.g., from a first gravitational acceleration metric to a second gravitational acceleration metric, etc.), an embodiment may dynamically adjust a time-keeping standard referenced by the device based on the identified change. Such a method may accordingly utilize the accelerometers already present in most devices to determine when users have launched, are in orbit, are in space transit, are on the surface of a particular celestial body (e.g., the Moon, Mars, etc.), etc. and dynamically switch to a predetermined time-keeping standard (e.g., Greenwich Mean Time, etc.) or other desired time-keeping standard.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, an acceleration measuring device such as an accelerometer, etc. System 100 often includes one or more touch screens 170 for data input and display/rendering. System 100 also typically includes various memory devices, for example flash memory 180 and SDRAM 190.

Figure 2:
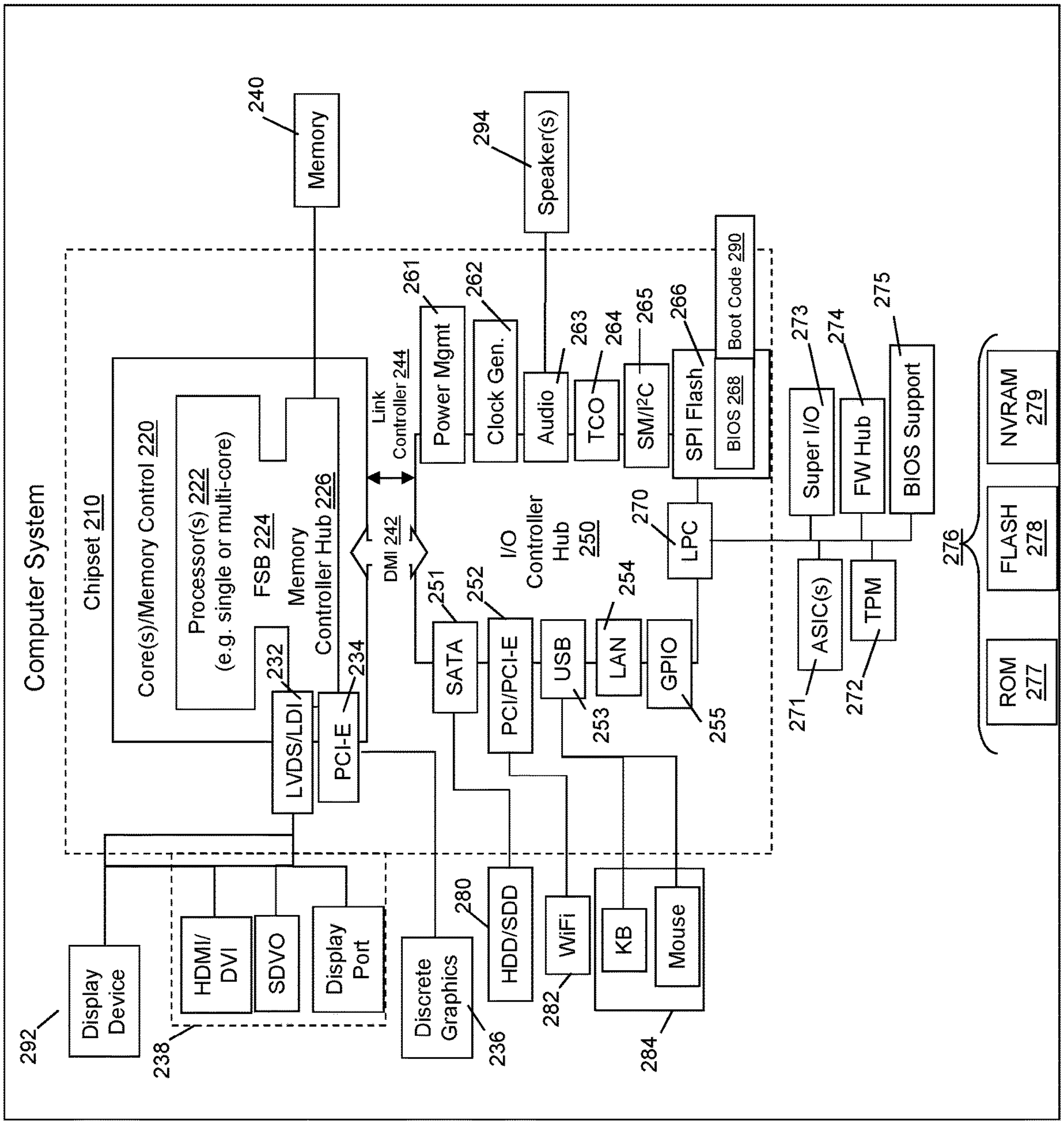
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, NC, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling circuitry, as for example outlined in FIG. 1 or FIG. 2, may be used in devices that contain a sensor capable of detecting gravitation acceleration, such as an accelerometer. For example, the circuitry outlined in FIG. 1 may be implemented in a phone or tablet embodiment, whereas the circuitry outlined in FIG. 2 may be implemented in a laptop.

Figure 3:
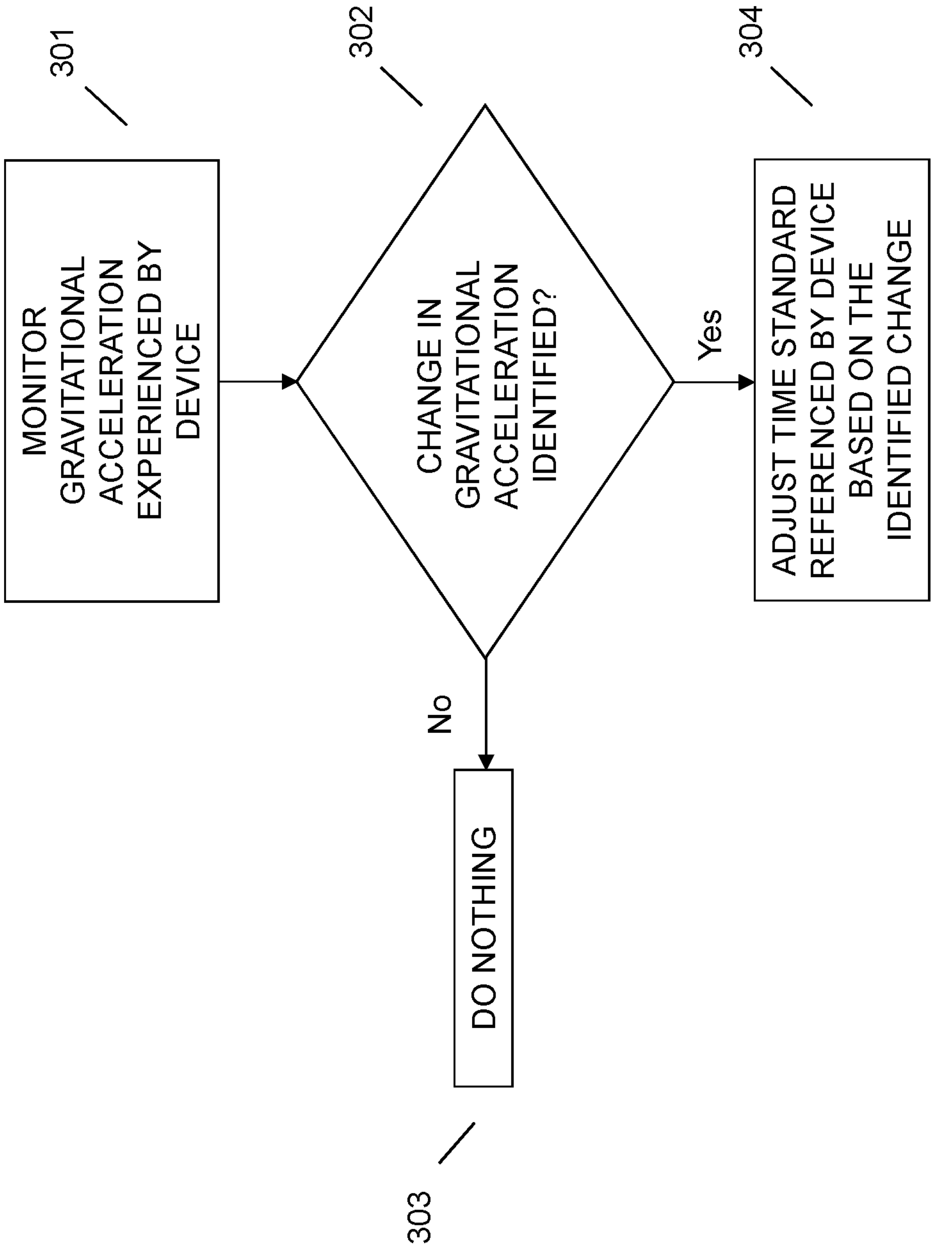
FIG. 3 illustrates an example method of adjusting a time-keeping standard associated with a device based on gravitational acceleration data.

Referring now to FIG. 3, an embodiment provides a method of dynamically adjusting a time-keeping standard referenced by the device based at least in part on gravitational acceleration data. At 301, an embodiment may monitor gravitational acceleration experienced by a device. In an embodiment, the gravitational acceleration may be monitored by a sensor capable of measuring such a metric (e.g., an accelerometer, etc.). The gravitational acceleration may be monitored substantially continuously, at predetermined intervals (e.g., every second, every minute, etc.), and/or in response to a predefined event (e.g., an embodiment may begin to monitor gravitation acceleration at the scheduled commencement of a trip, the knowledge of which may be obtained from a user's calendar data, etc.). It is important to note that although the measurement of gravitational acceleration is frequently described throughout as being measured by one or more accelerometers, such a designation is not limiting. More particularly, one or more additional sensors that may be capable of measuring the force due to gravity may be used in addition to, or in lieu of, an accelerometer.

At 302, an embodiment may identify whether a change has occurred in the gravitational acceleration experienced by the device. More particularly, responsive to identifying, at 302, that no change has occurred in the gravitational acceleration, an embodiment may, at 303, take no additional action. A consistent reading of the gravitational acceleration may indicate that a user's positional context has not changed (i.e., a user has remained on a particular celestial body or object, a user is still traveling through space, etc.). Conversely, responsive to identifying, at 302, a change in the gravitational acceleration (e.g., from a first gravitational acceleration metric to a second gravitational acceleration metric, etc.), then an embodiment may, at 304, adjust a time-keeping standard referenced by the device. This adjustment may occur automatically and without the presence of manual user input.

The adjustment of the time-keeping standard may be facilitated in one or more different ways. For instance, an embodiment may have access to a database (e.g., stored locally on the device, stored on another device or server but remotely accessible by the device, etc.) that contains a list of associations between gravitational acceleration metrics and their corresponding time-keeping standard adjustment protocols. For example, a particular database may contain the knowledge that the gravitational acceleration experienced by a device on Earth is approximately 9.8 $m/s^2$ and in space flight is 0 $m/s^2$. Additionally, the database may contain associations indicating that: when the gravitational acceleration is detected at 9.8 $m/s^2$ the device should utilize Earth-based GPS data to identify a relevant time zone for the device and when the gravitational acceleration is detected at 0 $m/s^2$ the device should adopt a predetermined time-keeping standard (e.g., Greenwich Mean Time (GMT) or some other time-zone standard designated by a user, etc.).

As time progresses and space colonization becomes more prevalent, the time-keeping standards on various celestial bodies (e.g., the Moon, Mars, etc.) may become more concrete. More particularly, for example, GPS satellites may eventually be deployed over Mars. In such a situation, when a device's gravitational acceleration is detected at approximately 3.721 $m/s^2$ (i.e., the gravitational acceleration for an object on Mars), an embodiment may access a database to conclude that the device is now on Mars and that it should utilize Mars-based GPS data, if available, to identify a relevant Martian time zone that the device is associated with.

In an embodiment, a time-keeping standard for a device may not be adjusted unless a system detects that the change from a first gravitational acceleration metric to a second gravitational acceleration metric is greater than a predetermined threshold. Such an adjustment requirement may ensure that a system does not inadvertently change the time-keeping standard due to slight or insignificant changes in detected gravitational acceleration (e.g., during sub-orbital travel, etc.).

In an embodiment, a space travel event may be associated with the change from a first gravitational acceleration metric to a second gravitational acceleration metric. For example, if an embodiment detects a change in the gravitational acceleration from 9.8 $m/s^2$ to 0 $m/s^{2'}$, an embodiment may conclude that a user carrying the device has just launched from Earth and is moving through space. Similarly, if an embodiment detects a change in the gravitational acceleration from 0 $m/s^2$ to approximately 1.62 $m/s^2$ (i.e., the gravitational acceleration associated with objects on the moon), then an embodiment may conclude that a user has just landed on the moon.

In an embodiment, additional data obtainable by the device may be utilized to provide further confirmation of the occurrence of a particular space travel event. For instance, a device may contain one or more additional sensors that may detect and/or measure the gravitational forces ("g-forces") acting on the device at a given time. Each space travel event (e.g., a launch from Earth, a launch from the Moon, a descent into Earth's atmosphere, etc.) has specific gravitational forces associated with it that may not be easily mimicked by naturally occurring movements. This g-force data may be stored in an accessible database that may be accessed to compare current g-forces experienced by the device to the g-forces associated with each space travel event. If a match is identified, an embodiment may receive additional confirmation that an assumed time-keeping standard determined by the gravitational acceleration data is appropriate. For example, an embodiment may detect a change from 0 $m/s^2$ to 9.8 $m/s^2$ and may predict that a user has just landed on Earth based solely on the gravitational acceleration data. An embodiment may receive additional confirmation about this prediction responsive to detecting g-forces associated with a descent into Earth's atmosphere.

In another example, and as an extension of the concept described in the previous paragraph, a small $O_2/N_2$ may be integrated into a device that is capable of detecting the amounts of Nitrogen in an environment. Nitrogen is non-essential to human respiration and the proportions of Nitrogen to Oxygen are different on the surface of the Earth when compared to inside an operating spacecraft. Accordingly, an embodiment may be able to detect, or confirm the occurrence of, a space travel event by monitoring the proportion of Nitrogen in a user's ambient environment and comparing it to a database of known Nitrogen proportions in different contexts (e.g., on the surface of the Earth, in space flight, when on the surface of other planets, etc.).

In an embodiment, an indication of the change in a device's gravitational acceleration and/or the identification of a particular space travel event associated with the device may be transmitted to at least one other device. The designation of devices that these updates may be sent to may be manually set and adjusted by a user. As an example of the foregoing, an individual embarking on a space trip from the Earth to Mars may desire to have their family automatically apprised of their travel status at major moments along the trip. In such a situation, a notification may be sent to the designated devices of the family members when the gravitational acceleration data indicates that a user has launched, when the user has broken orbit and is traveling through space, when the user is descending, and when a user has arrived on the surface of Mars.

The various embodiments described herein thus represent a technical improvement to conventional methods for dynamically identifying a time-keeping standard associated with a device. In an embodiment, gravitational acceleration data associated with a device may be monitored by a sensor such as an accelerometer. Responsive to identifying that the gravitational acceleration changes from one gravitational acceleration metric to another gravitational acceleration metric, an embodiment may dynamically adjust, without receiving additional user input, a time-keep standard referenced by the device based on the new gravitational acceleration metric. Such a method may ensure that a device of a user traveling through space is always properly apprised of the relevant, or user-desired, time.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:

monitoring, by an information handling device and an accelerometer, gravitational acceleration experienced by the information handling device;

identifying, based on the monitoring, a change in the gravitational acceleration from a first gravitational acceleration metric to a second gravitational acceleration metric; and adjusting, responsive to the identifying, a time-keeping standard referenced by the information handling device based on the second gravitational acceleration metric, wherein the adjusting comprises accessing a database comprising a listing of associations between time-keeping standards and gravitational acceleration metrics and identifying, in the database, the time-keeping standard associated with the second gravitational acceleration metric.

2. The method of claim 1, wherein the adjusting comprises adjusting the time-keeping standard responsive to identifying that the change from the first gravitational acceleration metric to the second gravitational acceleration metric is greater than a predetermined threshold.

3. The method of claim 1, wherein the adjusting comprises:

identifying a navigation system associated with the second gravitational acceleration metric;

identifying a position of the information handling device using data obtained from the navigation system;

accessing time zone data associated with the position of the information handling device; and adjusting the time-keeping standard based on the time zone data.

4. The method of claim 1, wherein the adjusting comprises dynamically adjusting the time-keeping standard reference by the information handling device without receiving manual user input.

5. The method of claim 1, further comprising updating an aspect of at least one application on the information handling device based on the time-keeping standard.

6. The method of claim 1, further comprising associating a space travel event with the change from the first gravitational acceleration metric to the second gravitational acceleration metric.

7. The method of claim 6, wherein the space travel event is selected from the group consisting of: a launch event, a space flight event, and a landing event.

8. The method of claim 6, further comprising transmitting an indication of the space travel event to at least one other device.

9. The method of claim 6, further comprising:
detecting, using at least one sensor integrated within the information handling device, a change in gravitational forces acting on the information handling device during the space travel event; and
confirming a type of the space travel event based upon an identification that the change in gravitational forces acting on the information handling device is consistent with the change in the gravitational acceleration of the information handling device for the type of the space travel event.

10. An information handling device, comprising:
an accelerometer;
a processor;
a memory device that stores instructions executable by the processor to:
monitor, using the informational handling device and the accelerometer, gravitational acceleration experienced by the information handling device;
identify, based on the monitoring, a change in the gravitational acceleration from a first gravitational acceleration metric to a second gravitational acceleration metric; and
adjust, responsive to the identifying, a time-keeping standard referenced by the information handling device based on the second gravitational acceleration metric, wherein the adjusting comprises accessing a database comprising a listing of associations between time-keeping standards and gravitational acceleration metrics and identifying, in the database, the time-keeping standard associated with the second gravitational acceleration metric.

11. The information handling device of claim 10, wherein the instructions executable by the processor to adjust comprise instructions executable by the processor to adjust the time-keeping standard responsive to identifying that the change from the first gravitational acceleration metric to the second gravitational acceleration metric is greater than a predetermined threshold.

12. The information handling device of claim 10, wherein the instructions executable by the processor to adjust comprise instructions executable by the processor to:
identify a navigation system associated with the second gravitational acceleration metric;
identify a position of the information handling device using data obtained from the navigation system;
access time zone data associated with the position of the information handling device; and
adjust the time-keeping standard based on the time zone data.

13. The information handling device of claim 10, wherein the instructions are further executable by the processor to update an aspect of at least one application on the information handling device based on the time-keeping standard.

14. The information handling device of claim 10, wherein the instructions are further executable by the processor to associate a space travel event with the change from the first gravitational acceleration metric to the second gravitational acceleration metric.

15. The information handling device of claim 14, wherein the space travel event is selected from the group consisting of: a launch event, a space flight event, and a landing event.

16. The information handling device of claim 14, wherein the instructions are further executable by the processor to transmit an indication of the space travel event to at least one other device.

17. The information handling device of claim 14, wherein the instructions are further executable by the processor to:
detect, using at least one sensor integrated within the information handling device, a change in gravitational forces acting on the information handling device during the space travel event; and
confirm a type of the space travel event based upon an identification that the change in gravitational forces acting on the information handling device is consistent with the change of the gravitational acceleration of the information handling device for the type of the space travel event.

18. A product, comprising:
a storage device that stores code, the code being executable by a processor and comprising:
code that monitors, using an information handling device, gravitational acceleration experienced by the information handling device;
code that identifies, based on the code that monitors, a change in the gravitational acceleration from a first gravitational acceleration metric to a second gravitational acceleration metric; and
code that adjusts, responsive to the code that identifies, a time-keeping standard referenced by the information handling device based on the second gravitational acceleration metric, wherein the adjusting comprises accessing a database comprising a listing of associations between time-keeping standards and gravitational acceleration metrics and identifying, in the database, the time-keeping standard associated with the second gravitational acceleration metric.

* * * * *